(12) United States Patent
Mandridake et al.

(10) Patent No.: US 9,361,744 B2
(45) Date of Patent: Jun. 7, 2016

(54) METHOD AND SYSTEM FOR AUTOMATICALLY CHECKING THE AUTHENTICITY OF AN IDENTITY DOCUMENT

(75) Inventors: Clarisse Mandridake, Gif-sur-Yvette (FR); Kristen Le Liboux, Paris (FR); Jean-Marc Kerisit, Courbevoie (FR)

(73) Assignee: HOLOGRAM INDUSTRIES, Bussy-Saint-Georges (FR)

( * ) Notice: Subject to any disclaimer, the term of this patent is extended or adjusted under 35 U.S.C. 154(b) by 2 days.

(21) Appl. No.: 13/509,918

(22) PCT Filed: Nov. 17, 2010

(86) PCT No.: PCT/FR2010/052439
§ 371 (c)(1),
(2), (4) Date: Sep. 5, 2012

(87) PCT Pub. No.: WO2011/061442
PCT Pub. Date: May 26, 2011

(65) Prior Publication Data
US 2012/0324534 A1    Dec. 20, 2012

(30) Foreign Application Priority Data
Nov. 17, 2009 (FR) ...................................... 09 58109

(51) Int. Cl.
*G06F 7/04* (2006.01)
*G06F 17/30* (2006.01)
(Continued)

(52) U.S. Cl.
CPC ............... *G07D 7/2016* (2013.01); *G06K 9/00* (2013.01); *G06K 9/00275* (2013.01); *G06K 9/00899* (2013.01); *G06K 9/36* (2013.01); *G07D 7/2025* (2013.01)

(58) Field of Classification Search
CPC . G07D 7/2033; G07D 7/2025; G07D 7/2016; G06K 9/00442–9/00577; G06K 9/00275; G06K 9/00899; G06K 9/36; G06K 9/00
USPC .............................................................. 726/2
See application file for complete search history.

(56) References Cited

U.S. PATENT DOCUMENTS

| 6,798,910 | B1 * | 9/2004 | Wilson .......................... 382/199 |
| 2003/0108373 | A1 | 6/2003 | Schofield |

(Continued)

FOREIGN PATENT DOCUMENTS

| EP | 0 640 946 | 3/1995 |
| JP | 2008-102757 | 5/2008 |

(Continued)

OTHER PUBLICATIONS

CSSN Scanshell.net User Guide version 1.0.9, Apr. 2007, Card Scanning Solutions, http://www.cardscanning.com/download.php, pp. 8 and 25-27.*

*Primary Examiner* — Linglan Edwards
*Assistant Examiner* — Forrest Carey
(74) *Attorney, Agent, or Firm* — Hamre, Schumann, Mueller & Larson, P.C.

(57) ABSTRACT

The process comprises a data-acquisition phase with the creation of a database of multicomponent digital signatures constituting fingerprints of identity documents, linked to a central server relocated relative to a primary database comprising variable textual data and images of reference identity documents.

A relocated checking phase of identity documents at a checkpoint comprises the digitizing of an identity document to be checked, the creation of a fingerprint of the digitized document, the comparison of the latter with the fingerprint of a document from the fingerprint database indexed with the same reference number and the sending of a message according to the result of the comparison.

20 Claims, 9 Drawing Sheets

(51) Int. Cl.
*G07D 7/20* (2016.01)
*G06K 9/36* (2006.01)
*G06K 9/00* (2006.01)

(56) References Cited

U.S. PATENT DOCUMENTS

| | | | |
|---|---|---|---|
| 2004/0039914 A1* | 2/2004 | Barr et al. | 713/176 |
| 2004/0081332 A1* | 4/2004 | Tuttle et al. | 382/100 |
| 2006/0157559 A1* | 7/2006 | Levy et al. | 235/380 |
| 2008/0294900 A1* | 11/2008 | Cowburn | G06K 9/00577 713/176 |
| 2009/0097695 A9* | 4/2009 | Rhoads | 382/100 |
| 2010/0021014 A1* | 1/2010 | Bebis | 382/115 |

FOREIGN PATENT DOCUMENTS

| | | |
|---|---|---|
| KR | 2002-0013035 JP | 2/2002 |
| WO | WO2008/014589 | 2/2008 |

* cited by examiner

FIG. 6 submitted document original document

FIG. 7

FIG.8 submitted document original document

FIG.9

METHOD AND SYSTEM FOR AUTOMATICALLY CHECKING THE AUTHENTICITY OF AN IDENTITY DOCUMENT

The aim of the present invention is a process and an automatic checking system of the authenticity of an identity document comprising at least one first zone of variable textual data and a second image zone.

In the fight against counterfeiting and falsification of identity documents, there is a need to be able to detect on the spot reliably and rapidly a falsified identity document, such as a passport, an identity card or a driver's license, for example.

An identity document comprises on the one hand fixed elements preset for blank titles (printed mentions, images, holograms, logos, watermarks, . . . ) and data specific to the owner of the identity document (variable textual mentions, images such as facial identity photograph, machine-readable information zone, known as MRZ).

Numerous techniques for securing identity documents and consequently reducing the risk of falsification are already known.

Identity documents can be subjected to digital watermarking (in English "watermarking").

According to another approach, character recognition technology is used to locate data contained in the MRZ zone of an identity document which comprises machine-readable information.

Other techniques focus on graphic elements and especially biometry and recognition of faces from an identity photo.

Security systems can incorporate several techniques and use graphic element visible only via ultraviolet or infrared, for example.

A problem arises however during checking of identity documents on the terrain, at a customs office for example, where it is not possible to have expensive equipment to analyse an identity document, or an entire reference database for questions of confidentiality.

The aim of the present invention is to rectify the above disadvantages and automatically check the authenticity of an identity document in situ without it being necessary to have costly and bulky equipment, or to have in place an entire nominative database which might risk being violated.

The present invention aims to enable easy, rapid and reliable detection of different fraudulent operations which can be put in place on identity documents, such as modification of variable data of an issued permit, falsification of stolen blank titles, counterfeiting, that is, the imitation of an official document.

According to the invention these aims are achieved by an automatic checking process of the authenticity of an identity document, comprising at least one first zone of variable textual data and at least one second image zone, characterised in that it comprises:
(a) a data-acquisition phase, comprising the steps consisting of:
  (a1) setting up a primary database in which at least the information contained in said first zone and second zone for a set of identity documents is recorded,
  (a2) extracting variable textual data from the information recorded in the primary database for the first zone of each of the identity documents by a process of optical character recognition and incorporating these textual data in coded form in a digital multicomponent signature called a fingerprint attributed to each of the identity documents,
  (a3) extracting graphic information from the image information recorded in the primary database for the second zone of each of the identity documents and creating at least one global fingerprint component obtained from the entire image gradient and at least a plurality of local fingerprint components obtained from a predetermined number N of blocks corresponding to subdivisions of the binarised image with covering of fixed dimension, for each of the identity documents, and
  (a4) recording the fingerprints of various identity documents in a fingerprint database linked to a relocated central server relative to the primary database, the fingerprints being indexed according to a reference number of the relevant identity document, and
(b) a relocated checking phase of identity documents to be checked in a checkpoint comprising the steps consisting of:
  (b1) digitising an identity document to be checked,
  (b2) extracting and reading by means of a process of optical character recognition the variable textual data contained in a first zone of the digitised identity document to be checked and coding said data to constitute a fingerprint component,
  (b3) extracting graphic information of the image contained in a second zone of the digitised identity document to be checked and creating a global fingerprint component obtained from the entire image gradient as well as a plurality of local fingerprint components obtained from a predetermined number N of blocks corresponding to subdivisions of the binarised image with covering of fixed dimension,
  (b4) comparing inside said central server the fingerprint of the identity document to be checked with the fingerprint of the identity document indexed in the fingerprint database with the same reference number, and
  (b5) sending a message indicating the result of the comparison and confirming the authenticity of the document to be checked or on the contrary identifying at least one image zone considered as suspect or as having been falsified.

Advantageously, the relocated checking phase also comprises a step consisting of verifying the quality of the data of the digitised document and sending an error message in case of insufficient quality of these digitised data.

In the event where the process is applied to the automatic checking of the authenticity of an identity document also comprising a third zone of machine-readable information, the relocated checking phase of the identity documents also comprises a step consisting of extracting and interpreting by means of a process of optical character recognition the data contained in a third zone of machine-readable information of the identity document to be checked and sending an error message in case of a reading error of this third zone.

The process can also comprise a verification step of the coherence of the variable textual data extracted from the first zone of the identity document to be checked and of the data extracted from the third zone of machine-readable information of the identity document to be checked.

According to an aspect of the invention, during extraction step b3) of the graphic information of an image of the second zone of the identity document to be checked, pre-processing is carried out comprising filtering operations aimed at cleaning the image of parasite noises introduced during the digitising step of the identity document to be checked.

Similarly, during extraction step b2 of the variable textual data of the first zone of the identity document to be checked, pre-processing is conducted aimed at correcting the defects introduced during the digitising step of the identity document to be checked or inherent to natural ageing of this document.

According to a particular embodiment, during the extraction step of the graphic information from the image of the second zone of the identity document to be checked the higher-order Zernike moments of the entire image gradient are calculated to obtain a global descriptor of the graphic information to create said global fingerprint component.

Advantageously, during extraction step of the graphic information of the image of the second zone of the identity document to be checked, the binarisation of the image intended to be subdivided into a predetermined number N of blocks with covering of fixed dimension comprises a first level of processing via detection of multi-scale contours and a second level of processing by an adaptive threshold.

In this case, the local fingerprint components are preferably obtained by calculating the form descriptors on the N blocks of the binarised image with an order greater than or equal to 12.

According to a first possible embodiment, the digitising step b1) of identity document to be checked is performed in a checkpoint distinct from the central server and the document digitised at said checkpoint is transmitted to the central server via telecommunication means.

According to another possible embodiment, the digitising step b1) of an identity document to be checked is performed in a checkpoint distinct from the central server, the steps of creating a fingerprint of the identity document to be checked are performed at the level of the checkpoint and the fingerprint of the identity document to be checked is transmitted to the central server via telecommunication means.

The invention also relates to an automatic checking system of the authenticity of an identity document comprising at least one first zone of variable textual data and a second image zone, characterised in that it comprises:
(a) data-acquisition module, comprising:
  (a1) a primary database (in which the information contained in said first zone and second zone for a set of identity documents is recorded,
  (a2) a first unit for extracting from the primary database the variable textual data of the first zone of each of the identity documents via a process of optical character recognition and for incorporating these textual data in coded form in a multicomponent digital signature called a fingerprint attributed to each of the identity documents,
  (a3) a second unit for extracting from the primary database the graphic information of the second zone of each of the identity documents and for creating at least one global fingerprint component obtained from the entire image gradient and at least a plurality of local fingerprint components obtained from a predetermined number N of blocks corresponding to subdivisions of the binarised image with covering of fixed dimension, for each of the identity documents, and
  (a4) a unit for recording the fingerprints of various identity documents in a fingerprint database linked to a relocated central server relative to the primary database, the fingerprints being indexed according to a reference number of the identity document specific to the latter, and
(b) a relocated control module of the identity documents to be checked comprising:
  (b1) a digitising unit of an identity document to be checked,
  (b2) a third unit for extracting and reading by means of a process of optical character recognition of the variable textual data contained in a first zone of the digitised identity document to be checked and for coding said data to constitute a fingerprint component,
  (b3) a fourth unit for extracting graphic information from the image contained in a second zone of the digitised identity document to be checked and comprising means to create a global fingerprint component obtained from the entire image gradient as well as means for creating a plurality of local fingerprint components obtained from a predetermined number N of blocks corresponding to subdivisions of the binarised image with covering of fixed dimension,
  (b4) a comparison unit inside the central server of the fingerprint of the identity document to be checked with the fingerprint of the identity document indexed in the fingerprint database with the same reference number, and
  (b5) a unit for sending a message indicating the result of the comparison and confirming the authenticity of the document to be checked or on the contrary identifying at least one image zone considered as suspect or as having been falsified.

Advantageously, the system also comprises a verification unit of the quality of the data of the digitised document and sending of an error message in case of insufficient quality of these digitised data.

In the event where the system is applied to the automatic checking of the authenticity of an identity document also comprising at least one third zone of machine-readable information, the relocated control module also comprises a verification unit for extracting and interpreting by means of a process of optical character recognition the data contained in a third zone of machine-readable information of the identity document to be checked and for sending an error message in case of a reading error from this third zone.

In such a system, the verification unit can also comprise means for verifying the coherence of the variable textual data extracted from the first zone of the identity document to be checked and of the data extracted from the third zone of machine-readable information of the identity document to be checked.

According to a particular embodiment, said fourth extraction unit of graphic information of the image of the second zone of the identity document to be checked comprises a pre-processing unit for conducting filtering operations aimed at cleaning the image of parasite noises introduced during the digitising of the identity document to be checked.

Similarly, according to another aspect of the invention, said third extraction unit of variable textual data of the first zone of the identity document to be checked comprises a pre-processing unit comprising correction means of defects introduced during the digitising step of the identity document to be checked or inherent to natural aging of this document.

According to a possible embodiment, said third and fourth units are located at the level of a terminal of an identity document to be checked and said relocated control module comprises an Internet connection interface for communicating with said central server comprising a receiving unit of the fingerprint of the identity document to be checked, said fingerprint database, said comparison unit and said message-sending unit.

According to another possible embodiment, said third and fourth units are located at the level of said central server and said relocated control module comprises an Internet connection interface for sending the digitised document to be checked to said central server comprising said third and fourth units for creating the fingerprint of the digitised identity document to be checked, said fingerprint database, said comparison unit and said message-sending unit.

According to yet another possible embodiment, said central server comprising said third and fourth units for creation of the fingerprint of the digitised identity document to be checked, said fingerprint database, said comparison unit and said message-sending unit is located geographically at the level of a terminal of an identity document to be checked and relocated relative to said primary database.

Figure 1:
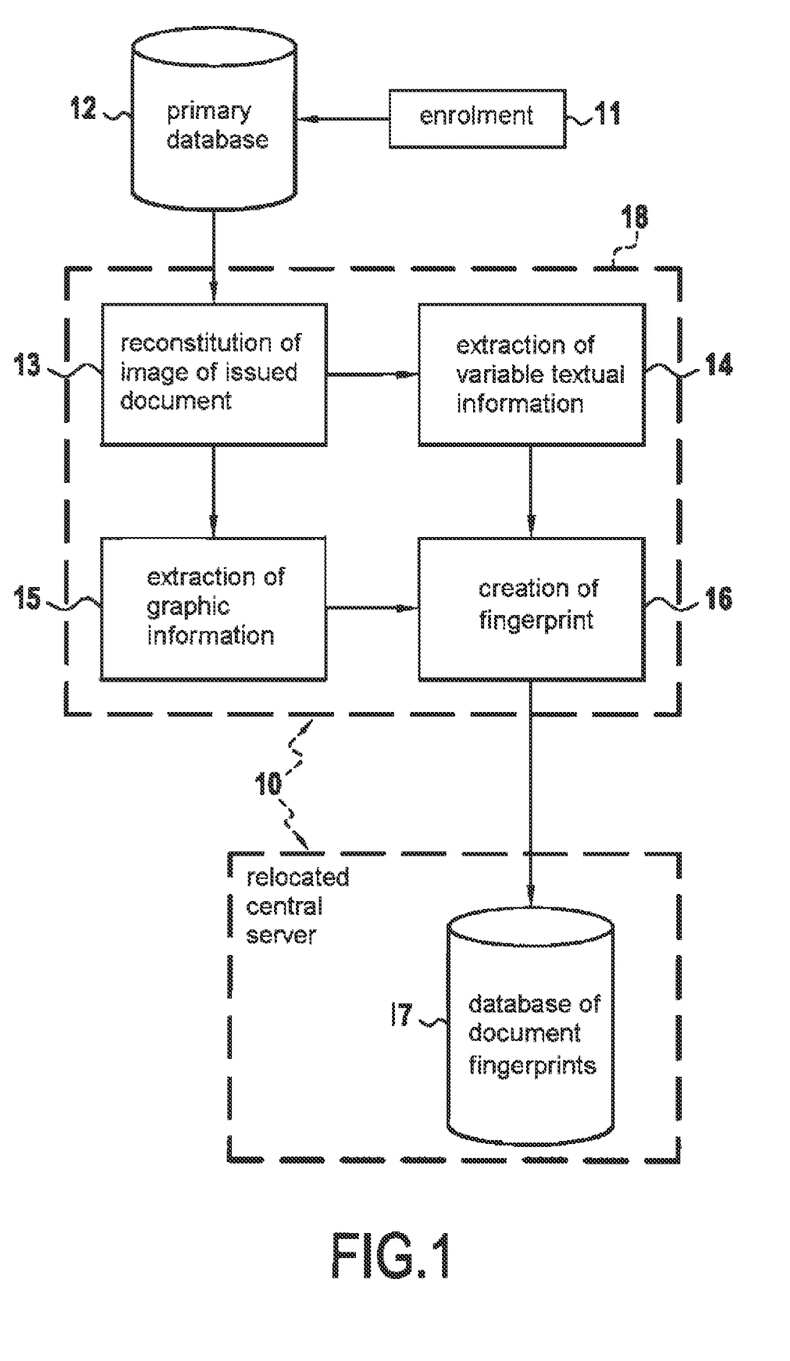
FIG. 1 is a block diagram showing a data-acquisition system usable within the scope of the present invention.

Other characteristics and advantages of the invention will emerge from the following description of particular embodiments, given by way of example, in reference to the attached diagrams, in which:

FIG. 1 shows the diagram of an example of a data-acquisition module according to the invention.

A primary database 12 combines all the nominative data relative to a group of owners of a given identity document (passport, identity card, driver's license, residence card, ... ) and is localised with the organisation responsible for producing identity documents (Ministry, Prefecture, ... ).

According to a first possibility, the primary database 12 is constituted during the creation of new identity documents, during an enrolment process 11. In this case, during enrolment of a person in light of delivery of an identity document, his personal data photograph, signature, ... are recorded by the organisation responsible for producing the document. Specific characteristics linked to the document (passport, identity card, registration card, etc.) and to his origin (organisation, country, etc.) are added to these personal data (logos, lamina, etc.). These reference data are then stored in the primary database 12.

The primary database 12 can however also globally comprise pre-existing identity documents already in circulation from reference files.

In the same way the primary database 12 contains various information available on the owners of the identity documents (photograph, signature, various characterisable personal information) as well as information (texts, logos) specific to the type of identity document in question.

Figure 4:
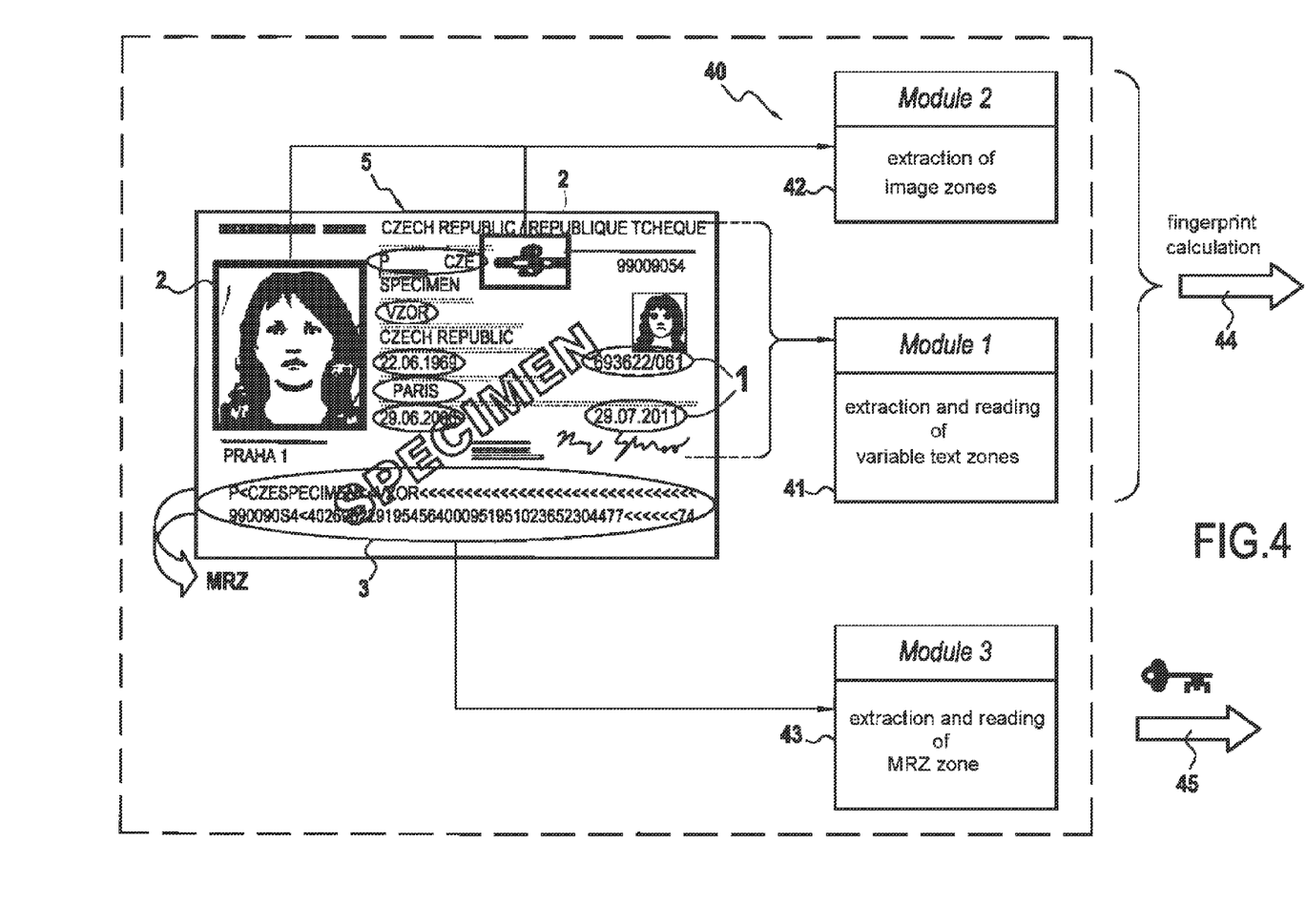
FIG. 4 shows an example of an identity document with the extraction of discriminating attributes according to the invention.

In general, the primary databases 12, which contains nominative data, comprises at least information contained in one or more zones 1 of variable textual data and in one or more zones 2 of images of each identity document to be referenced (see FIG. 4).

FIG. 1 shows a module 18 for creating, from the data recorded in the primary database 12, a fingerprint database 17 containing the fingerprints of various identity documents taken into account in the primary database 12.

In the present description, fingerprint means a multicomponent digital signature attributed to each of the identity documents.

The module 18 essentially comprises a unit 13 for extracting from the primary database 12 the data relative to a particular identity document and reconstituting the image of this document, an extraction unit 14 of variable textual data, an extraction unit 15 of graphic information and a unit 16 for creating a fingerprint intended to be recorded in the fingerprint database 17.

More particularly, the units 13, 14, 16 extract from the primary database 12 the variable textual data of the first zone 1 of each of the identity documents via a process of optical character recognition and incorporate these textual data in coded form in the fingerprint attributed to each of the identity documents.

Figure 5:
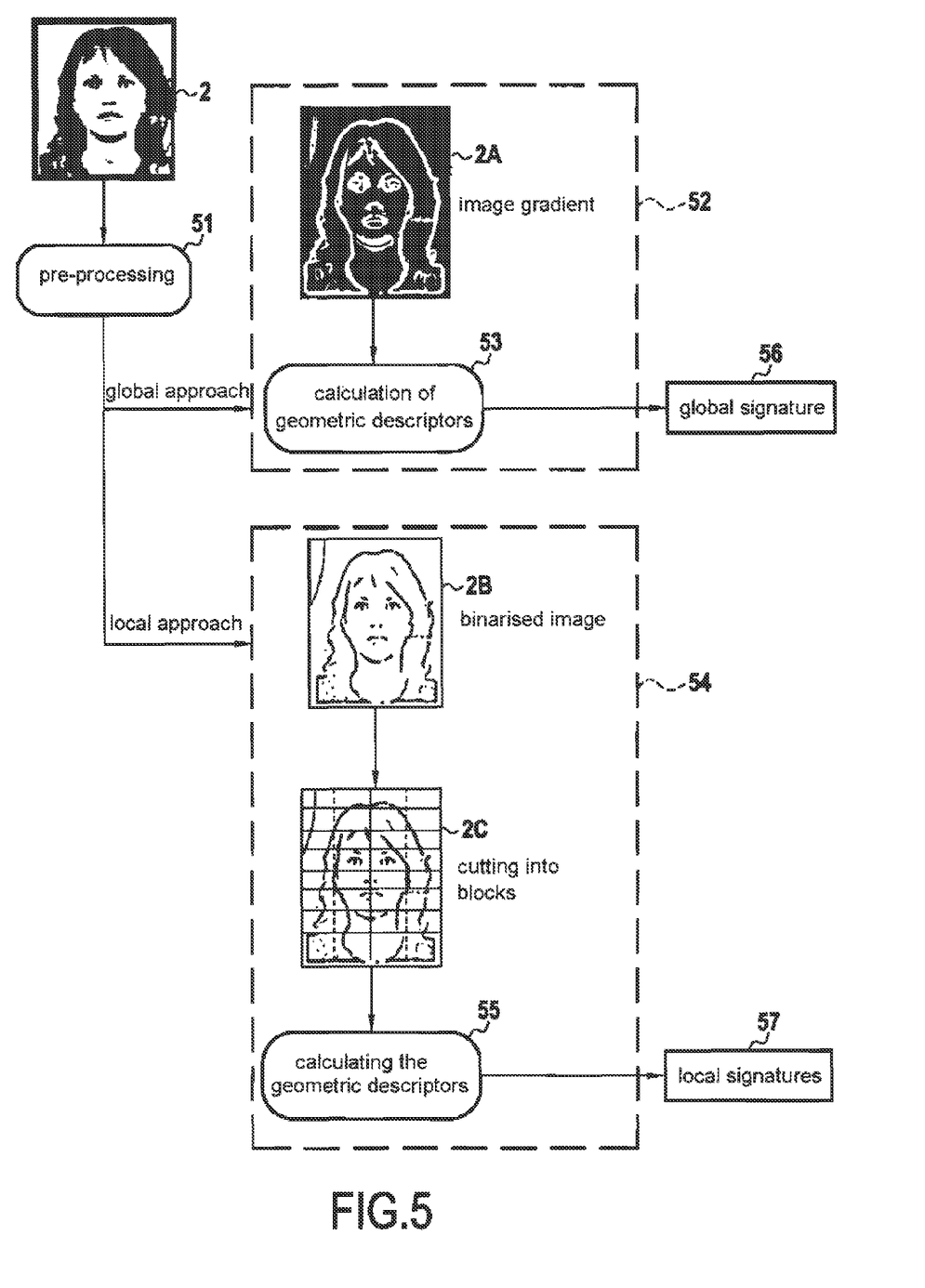
FIG. 5 is a diagram showing an example of a process for calculating a fingerprint applicable to the present invention.

The units 13, 15, 16 extract from the primary database 12 graphic information of the second zone 2 of each of the identity documents and create at least one global fingerprint component obtained from the entire image gradient and at least a plurality of local fingerprint components obtained from a predetermined number N of blocks corresponding to subdivisions of the binarised image with covering of fixed dimension, for each of the identity documents, as will be explained hereinbelow in reference to FIG. 5.

The recording of fingerprints of various identity documents is done in the fingerprint database 17 linked to a central server 10 relocated relative to the primary database 12. The fingerprints are indexed according to a reference number of the identity document specific to the latter.

The advantage of the fingerprint database 17 is that it is both less bulky than the primary database 12 and above all is anonymised, which allows it to be delocalised relative to the primary database 12, with the central server 10 which also comprises the module 18, without risk to confidentiality. Also, during a checking operation of a document, to be described hereinbelow, the classifying of fingerprints with indexing as per the reference number of the document specific to the latter enables comparisons to be made between two documents only, guaranteeing very fast processing. Also, when compared to photo comparison techniques, the technique of using fingerprints according to the invention is highly advantageous to the extent where a fingerprint database is smaller in size and the relative weight of a fingerprint is less than that of a classic photo.

The control, relocated relative to the primary database 12, for example at a border checkpoint, intended to detect whether a given identity document 5 is authentic or not, is performed at the level of a document terminal 21 where, after verification of the first-level visual security elements of the identity document, a controller, if he has any doubt as to the authenticity of the document, can utilise the system according to the invention for electronic verification of the validity of the document.

Figure 2:
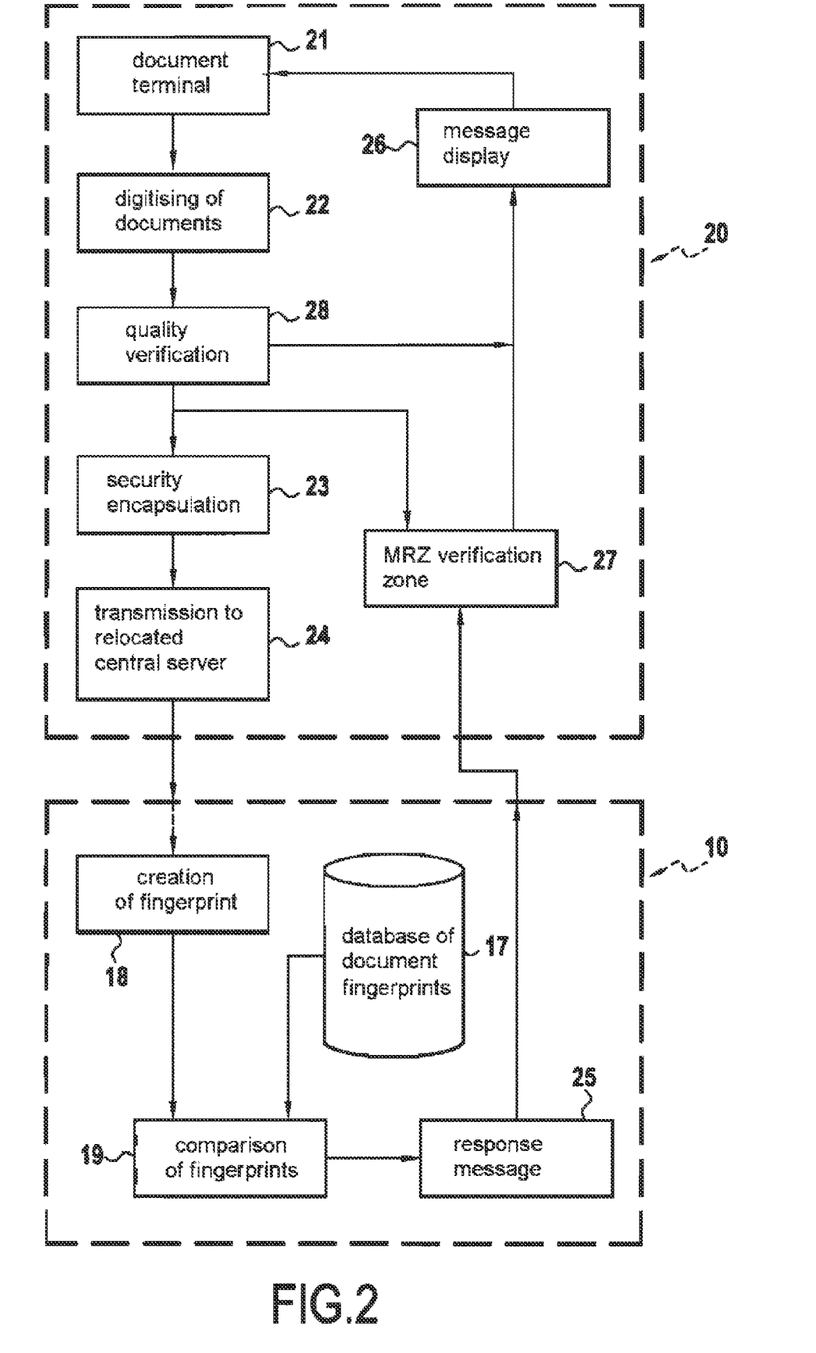
FIG. 2 is a block diagram of a first embodiment of a control module usable within the scope of the present invention.
Figure 3:
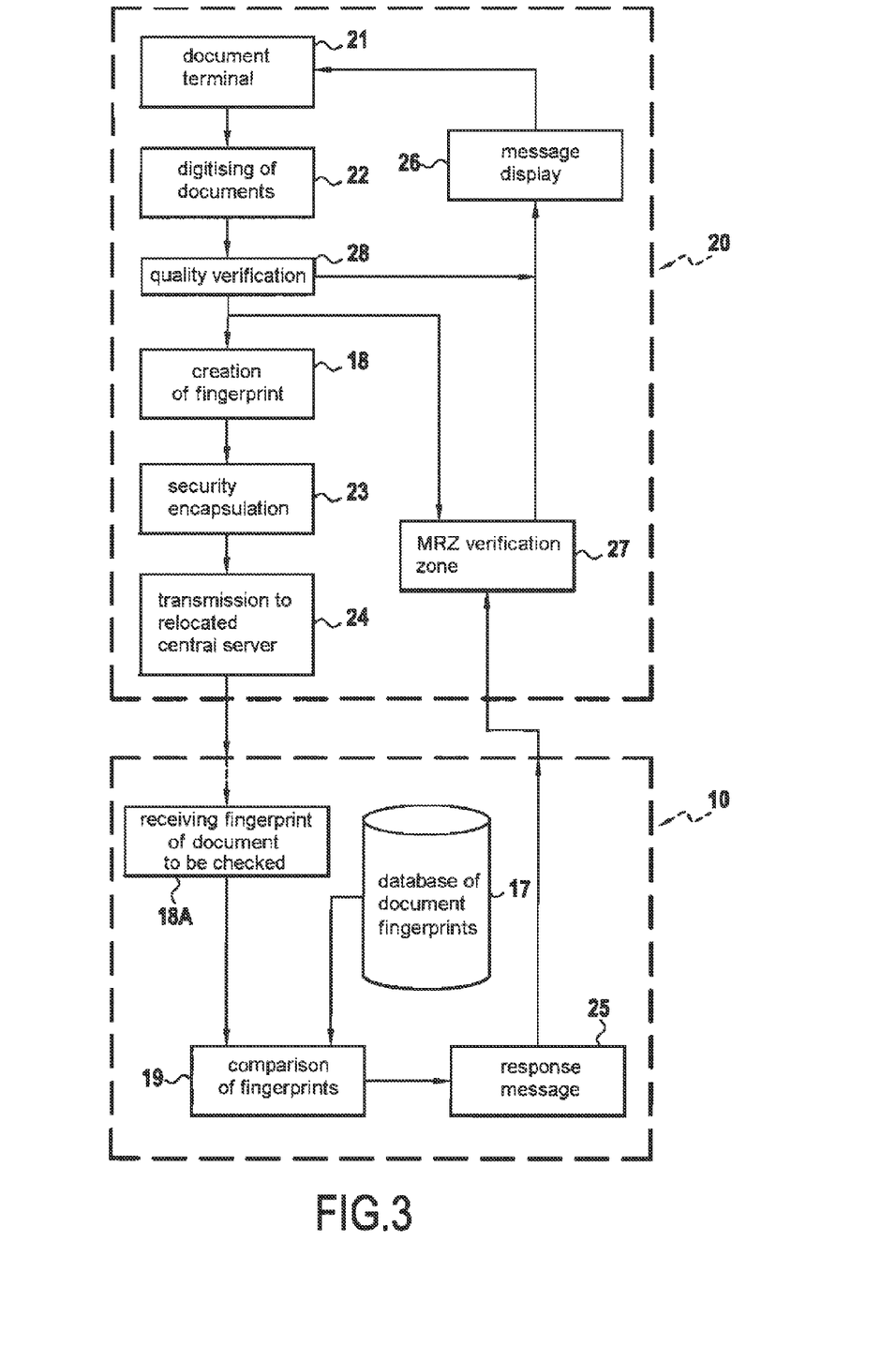
FIG. 3 is a block diagram of a second embodiment of a control module usable within the scope of the present invention.

As shown in FIGS. 2 and 3, a control module 20 first comprises a unit 22 for digitising the document to be checked 5 (FIG. 4).

A verification unit 28 of the quality of the data of the digitised document enables sending of an error message to the terminal 21 in case of insufficient quality of the digitised data. The digitising process can then be reiterated with greater care, where required.

In the case of the embodiment of FIG. 2, the data originating from digitising of the document 5 to be checked, after validation at the level of the unit 28, form the subject of security encapsulation in the unit 23, then are transmitted via an interface 24, preferably in encrypted form, for example via an Internet connection, to the central server 10 which can be located at a point distant from both the primary database 12 and the checkpoint 20.

In the embodiment of FIG. 2, the central server 10 comprises a fingerprint-creation module 18, which can be similar to the module 18 used by the acquisition and creation phase of the fingerprint database 17, but preferably also uses pre-processing, as will be explained later, to take into account any possible defects introduced during the digitising step.

The fingerprint calculated in the module 18 for the digitised document to be checked 5 is compared to the original fingerprint of the document which, in the fingerprint database 17, has the same reference number.

Following comparison performed in the unit 19, a response message is created in the unit 25 to be sent to the terminal 21.

The embodiment of FIG. 3 shows a variant in which the data of the digitised document 5 to be checked are first submitted to the fingerprint-creation module 18, located at the level of the checkpoint 20, near the terminal 21, then the fingerprint calculated in this module 18 forms the subject of security encapsulation in the unit 23 to then transmitted be, preferably in encrypted form, via the transmission interface 24, for example via the Internet network, to the central server 10.

Since the data of a fingerprint are completely anonymous, even in case of faulty encryption, in this case there is no risk of breaking confidentiality.

At the level of the server 10, the unit 18A receiving the fingerprint of the document to be checked provides this fingerprint to the comparison circuit 19 similar to that of FIG. 2. A response message is created in the same way as in the embodiment of FIG. 2, in the unit 25.

Due to the fact that a fingerprint database 17 is much smaller than a primary database 12 and does not show nominative data, and due to the fact that the calculation of fingerprints and the comparison of two fingerprints can easily be completed by means of a micro-computer, according to a particular embodiment, the entire central server 10 can be shifted or duplicated and be linked to the checkpoint 20 via the terminal 21 of the documents to be checked. In this case, the interface 24 is simplified and the security encapsulation unit 23 can also be omitted. The primary database 12 containing all the sensitive nominative data stays in its original site and cooperates with a central server 10 only for updating operations of the fingerprint database 17 during enrolment of new persons asking for an identity document.

FIG. 4 shows the principle of the extraction of discriminating attributes of an identity document 5. In this example, the identity document 5 is divided into three characterisable zones which are the discriminating attributes of the document.

A set of zones 1 comprises variable textual data, which comprise biometric texts comprising explicitly and especially the identity of the person and the validity of the document (for example name, first names, sex, nationality, date of birth, duration of validity, . . . ), a set of zones 2 comprising images, (such as identity photograph representing a face, signature, a logo, a hologram . . . ) and a zone 3 called MRZ containing machine-readable information, this third zone being optional.

The extraction device 40 of discriminating attributes of the document 5 comprises essentially an extraction and reading module 41 of zones of variable text, which operates over all or part of the zones 1, an extraction module 42 of image zones, which operates over all or part of the zones 2 and an extraction and reading module 43 of the zone 3 called MRZ. A module 44 calculates fingerprints from the information supplied by the modules 41 and 42 while the information coming from the module 43 can be used directly in a module 45 to carry out verification which can constitute a first level of verification, prior to taking into account zones 1 and 2, but can also enable verification of the coherence of data between zones 1 and 3. In the embodiments illustrated in FIGS. 2 and 3, the verification unit of the MRZ zone which combines the above functionalities is referenced 27 and delivers messages which are taken into account by the display unit 26 to deliver a message at the level of the terminal 21.

The system according to the invention is based on advance techniques of character recognition and images, but relatively lean in calculations, due to the fact of the selection of particular zones of the document to be authenticated and not of the document overall.

Calculation of the multicomponent graphic fingerprint is undertaken from a number of reference points located in the document at the level of the variable graphic element (identity photograph, signature, or various graphic objects affixed to the document identifying its provenance, as well as the different characterisable fields of a document, specifically for example name and first name, date of validity, . . . ) and therefore guarantees that personal data are made secure. It is actually impossible to go back to information relative to the bearer of the document from the calculated fingerprint.

As has been indicated earlier, the software for calculating the fingerprints and comparing them is housed on a central server 10. When this is relocated relative to the terminal 21 of documents to be checked, security mechanisms such as the encapsulation of data and their encryption ensure protection during transfer of these data between the checkpoint 20 and the central server 10, but as indicated earlier, the fingerprinting technique prevents any reconstitution of documents, therefore the checking phase is conducted without using the primary database 12.

Also, during checking, because the comparison is made document to document, that is, the fingerprint of a document to be checked is compared to the single fingerprint of the fingerprint database corresponding to the reference identity document bearing the same reference number, the response time of the system is a few seconds only, apart from the information transmission time which is associated with the available rate for liaison between the checkpoint 20 and the central server 10. An Internet connection must preferably be an ADSL line.

The digitising unit 22 of the checkpoint 20 can comprise a simple digitiser (scanner) compatible TWAIN available commercially, of minimal resolution of 400 dpi.

At the time of electronic identity verification, the information relative to the identity document 5 to be checked is obtained from the digitising of this document. This is why the checkpoint 20 preferably comprises a verification unit 28 of the quality of the digitised data to ensure maximal authentication reliability (FIGS. 2 and 3).

This verification step comprises a set of quality tests aimed at responding to the question: <<are the data received exploitable?>>

These quality tests can comprise verification of the reading with optical character recognition of text zones, for example by examining the validity of the number of the digitised document.

These tests can also comprise verification of the good quality of the images by examining the resolution and degree of degradation associated with either the materiel of the scanner, or the document itself.

In the event where the identity document to be checked 5 comprises a zone 3 of MRZ type, the verification unit 27 of MRZ zone locates this zone 3 by means of a simple algorithm for analysis image and symbol tracking. The data of this zone 3 are then extracted and interpreted by means of a character recognition algorithm of OCR type. If reading of the zone 3 of MRZ type fails, the unit 27 sends a message stipulating this reading error to the user interface of the terminal 21 by means of the message sending unit 26.

In the unit 14 for extraction of variable textual information, which is a subset of the module 18 for creating a fingerprint (FIGS. 1, 2 and 3) and corresponds to the module 41 of FIG. 4, all or part of the characterisable textual data present in zones 1 of the digitised identity document 5 to be checked are extracted using a character recognition algorithm. This algorithm, within the scope of the checking phase, preferably integrates a pre-processing phase which considers possible deterioration of the document due to digitising, repeated photocopies, slight rotations at the time of acquisition or even to natural wear of the identity document 5.

The variable textual data extracted from zones 1 of the document can be added to the fingerprint in coded form for example by an algorithm of MD5 type. Such a coding technique ensures security while preventing a return to original information. Also, it ensures during checking that the data have not been modified.

The textual data extracted from zones 1 can serve to verify whether they correspond to corresponding data stored in zone 3 of MRZ type. This extra verification conducted at the level of the verification unit 27 of FIGS. 2 and 3 contributes to reinforcement of verification and detection at this level of any falsifications, and boosts the reliability relative to security systems performing one check only using zone 3 of MRZ type.

The multicomponent fingerprint of the document to be checked 5, which comprises the coded textual data extracted from some at least of zones 1, also comprises graphic fingerprint components which are obtained from image zones 2 located by a simple image analysis algorithm.

Given the image zones 2, calculation of the components of the graphic fingerprint is performed in the units 15, 16 of the module 18 and will be explained in reference to FIG. 5.

The image zones 2 are generally composed of photographs, logos, and holograms or similar and constitute graphic elements. Any pertinent information contained in these graphic elements and likely to be used for authentication, such as the particular seal of a country, the characteristics of the photo (shape of the face, hair, glasses, skin colour, . . . ) can be extracted and analysed. On completion of this step, each graphic element is represented by a multicomponent fingerprint, each component of the fingerprint contributing to a different degree of verification at the time of authentication.

The calculation of the fingerprint of zone 2 constituted by a face photograph will be described hereinbelow by way of example. Since the aim is to detect any falsification, the photograph is analysed hierarchically, from the overall photo to finer subdivision defined by blocks of fixed size. An overall approach (unit 52 of FIG. 5) and a semi-local approach can be seen, by blocks (unit 54 of FIG. 5).

To clean the photo of all noise emanating from the digitising phase, a pre-processing step is carried out in a unit 51 which utilises different filters well known in the field of image processing: for example median filter, histogram equalisation, centred-reduced standardisation, the aim being to get the cleanest possible image according to the type of noises processed.

On completion of the pre-processing step of the unit 51, next comes the unit 52 for calculating the global component of the fingerprint per se by considering the photograph in its entirety. To be invariant to changes in contrast or to any noises which may alter the photo, the image module of the gradient 2A is characterised instead of the image 2 itself.

The module of the gradient or image gradient reveals contour details which can be characterised by an approach based on the higher-order Zernike moments. The Zernike moments are calculated over the entire image gradient and constitute the global descriptor of this graphic element.

The step 53 for calculating geometric descriptors in the unit 52 essentially comprises taking into account the contours of the image which is the most discriminating element. However, it is also possible to take into account the colour or texture of the image to work out the global signature 56 or global component of the graphic fingerprint.

A global geometric descriptor is inadequate for detecting any highly localised falsification, for example if it is located on a small surface of the photo. To rectify this problem, the unit 54 uses a binarised image 2B and the photograph is subdivided into a number N of blocks with covering of fixed dimension (see image 2C). This subdivision is done so as to respect the characteristics of the human face, considering especially the symmetry of the face and of the notion of characteristic zones of the face which are the most discriminating zones such as eyes, nose, and mouth.

The use of a binarised image 23 better processes any modification made to the photo, however small. In identity documents 5 to be checked, there is the risk that the document to be checked has suffered some natural wear and the digitising process is well placed to introduce some defects. Also, binarisation must be done such that any possible degradation of the photo is best tolerated. According to an aspect of the invention, two levels of processing are preferably used for this, specifically an approach for detection of multi-scale contours and an adaptive threshold adapted to refine binarisation.

Step 55 for calculating the geometric descriptors for the unit 54 uses the calculation of form descriptors such as for example the geometric moments for the N binarised blocks. The order is set high so as to characterise all possible details. By way of example, an order greater than or equal to 12 can be selected to get satisfactory results at the level of N local signatures 57 corresponding to N blocks and constituting the local components of the graphic fingerprint.

The message display unit 26 brings a scaled response at the level of the terminal 21 of the checkpoint 20 which allows the verifier to quickly understand what is happening in case of a problem.

In this way, the display unit 26 can send an error message originating from the verification unit 28 of the quality if the data received from the digitising unit 22 are unusable, for example following a problem of quality of the digitiser (scanner). The error message can then suggest that the user repeats the digitising.

The display unit 26 can also transmit an error message following verification of the zone 3 of MRZ type via the verification unit 27.

The display unit 26 also relays the resulting response message via the unit 25 of the central server 10 which can indicate that the document to be checked is authenticated or on the contrary may contain an indication of the zone of the document to be checked which poses a problem in the event where the document is indicated as false or can signal that there is doubt over one of the elements and the system cannot decide.

The automatic checking system of the authenticity of an identity document according to the invention detects any attempt at falsification made to the document, ranging from simple modification of text zones 1 (for example by scratching or rewriting of an element in a text zone 1) to the graphic element images at different points (for example, an attempt to peel off lamina, modification of the photograph, falsification of holograms, . . . ).

The message display unit 26 can constitute a user interface combined with the document terminal 21.

Figure 6:
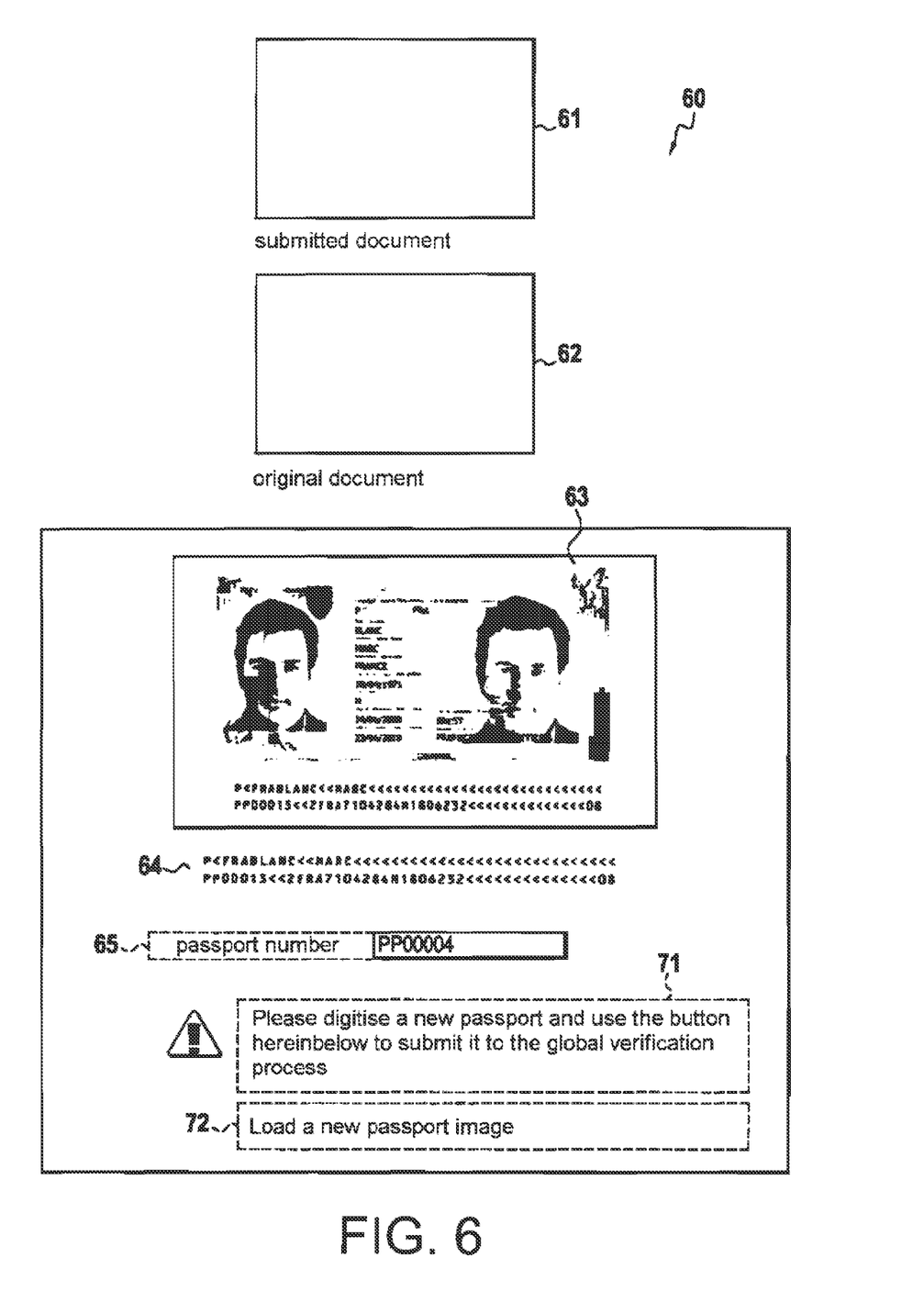
FIG. 6 is an example of a user interface of a control module of an automatic checking system according to the invention.

FIG. 6 shows a possible example of an user interface 60 including the function of the message display unit 26.

The user interface 60 can comprise a display space 61 for the submitted document 5 to be checked, after digitising and a display space 62 for the corresponding reference document reconstituted from the information coming from the fingerprint database 17.

The user interface 60 can further comprise a display space 63 larger in size than the display space 61 of the submitted document 5, as well as a special display space 64 of zone 3 of MRZ type of the identity document, if the latter exists, such as appears after recognition by the verification unit 27.

The user interface 60 can also comprise a display zone 65 for particular identification data, such as the number of the identity document, message display zones such as zone 71 and where required control buttons such as the key 72.

FIG. 6 illustrates by way of example a key 72 for loading a new passport image and a message 71 which reads as: <<Please digitise a new passport and use the button hereinbelow to submit it to the global verification process>>.

Figure 7:
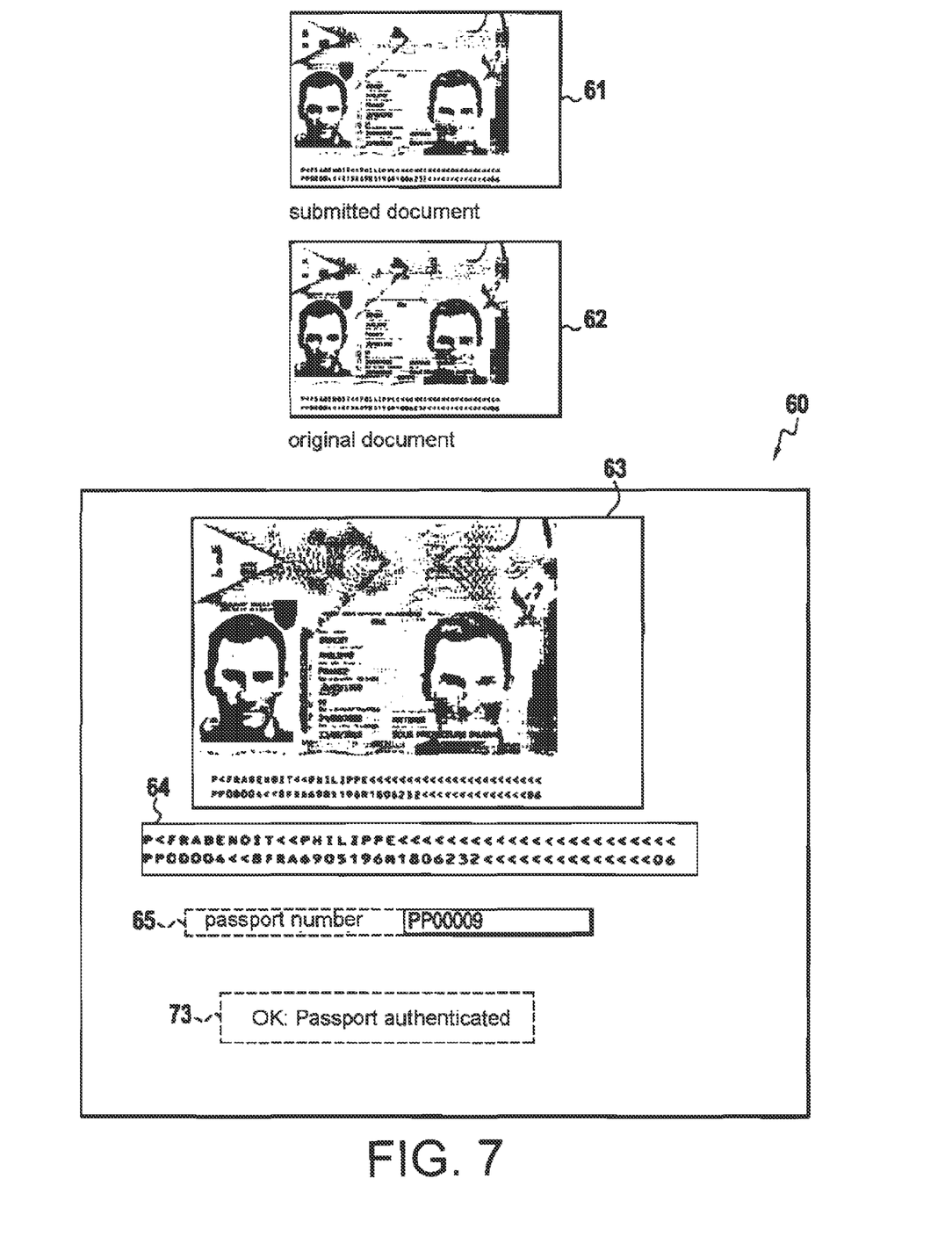
FIG. 7 is an example of an interface similar to that of FIG. 6 showing the case of an authenticated document.

FIG. 7 shows an exam pie of a user interface 60 in the case of an authenticated document, in this case the two images of the submitted document 5 and of the reference document appear respectively in the spaces 61 and 62 and a message 73 is displayed by way of example with the mention: <<OK: Passport authenticated>>.

Figure 8:
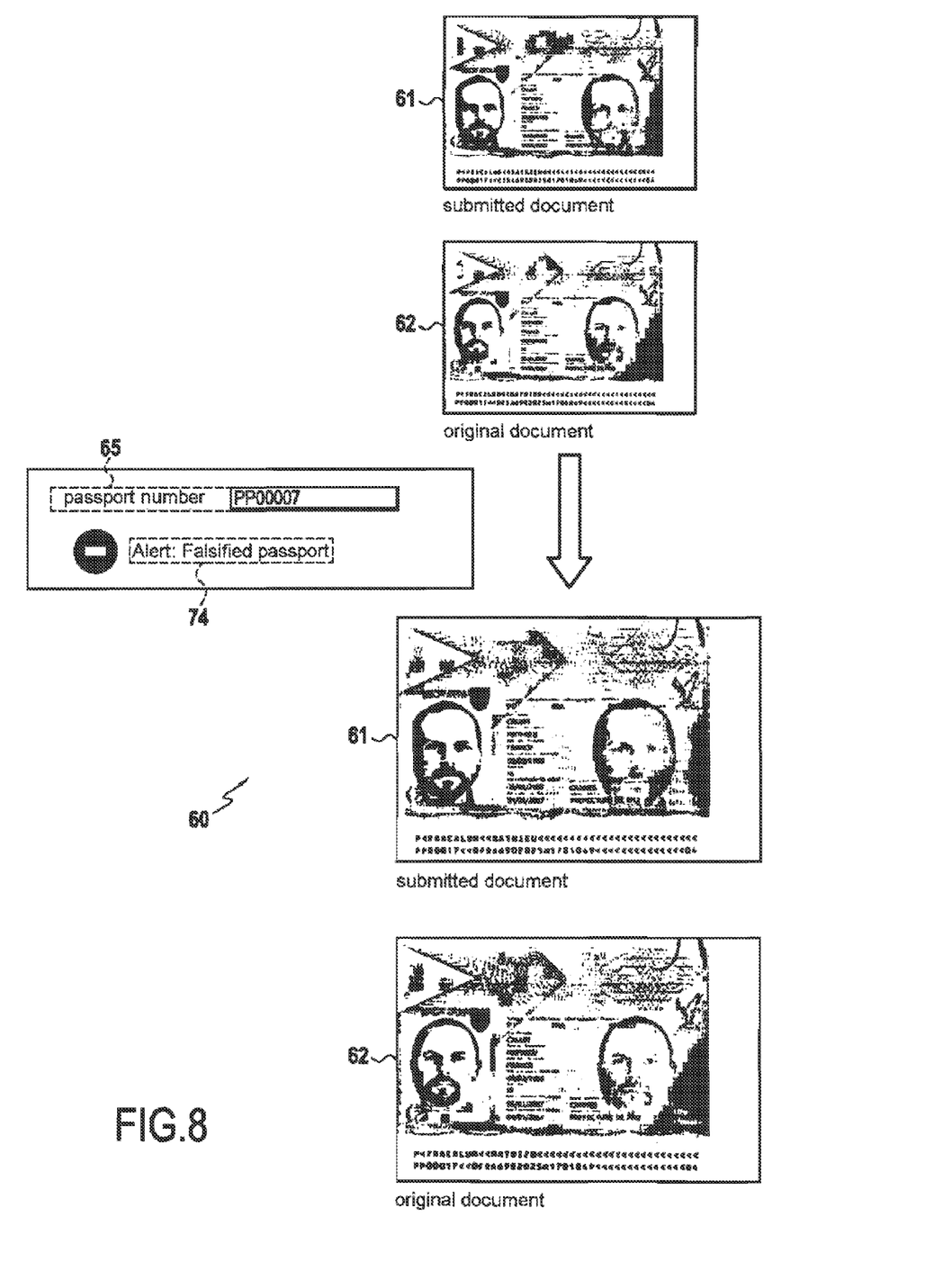
FIG. 8 is an example of an interface similar to that of FIG. 6, showing the case of a falsified document with an invalid photo.

FIG. 8 shows an example of a user interface 60 in the case of an unauthenticated falsified document because the identity photograph has been recognised as not valid. The two images of the submitted document 5 and of the reference document appear respectively in the spaces 61 and 62 and an alert message 74 is displayed by way of example with the mention: <<Alert: Passport falsified>>.

Figure 9:
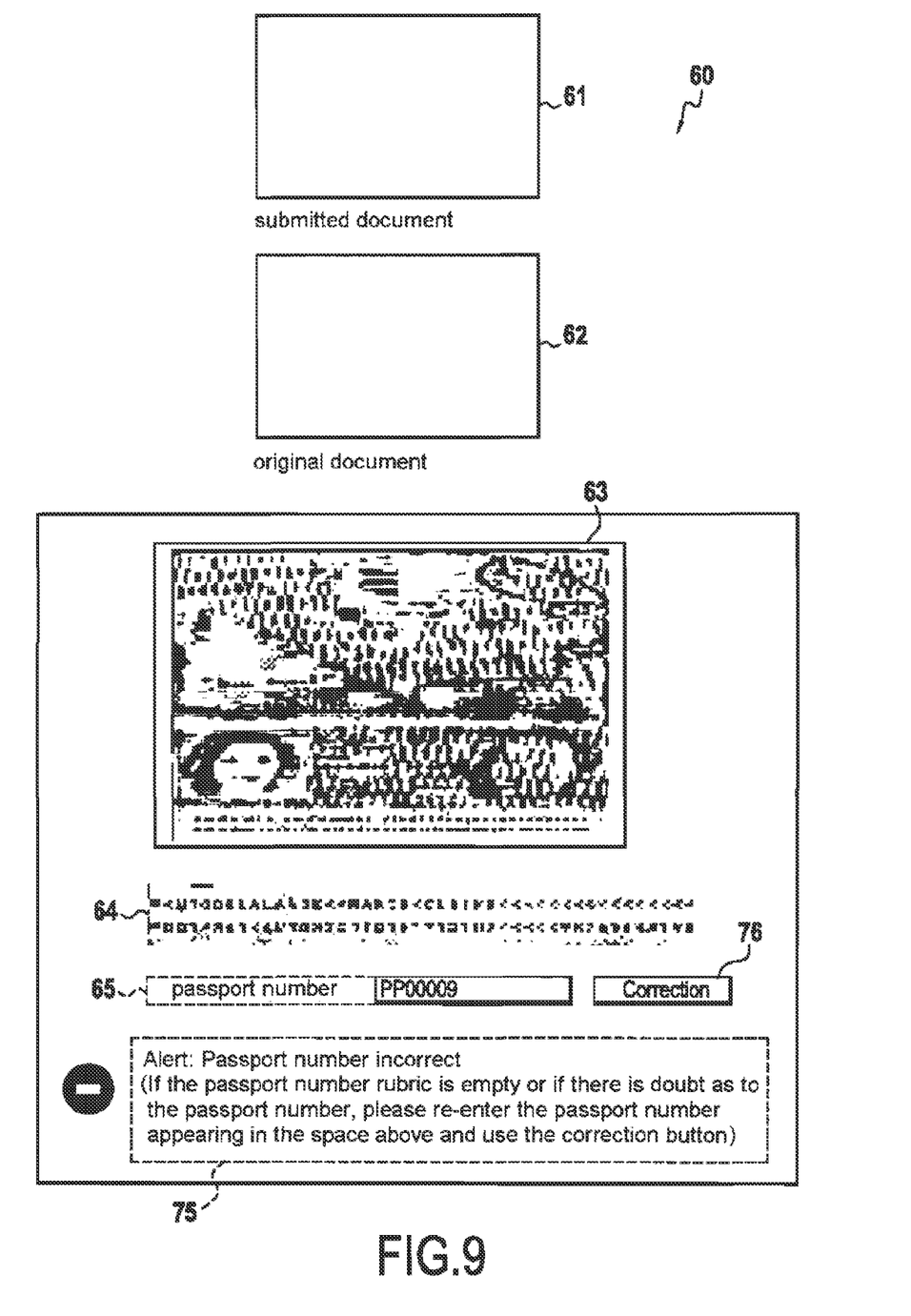
FIG. 9 is an example of an interface similar to that of FIG. 6, showing the case of a document exhibiting incorrect textual data.

FIG. 9 shows an example of a user interface 60 in the case of a document whereof the number displayed in the space 65 has been recognised as not valid. At this initial stage of verification, the two images of the submitted document 5 and of the reference document do not yet appear in the spaces 61 and 62. An alert message 75 is displayed by way of example with the mention: <<Alert: Passport number incorrect (if the passport number rubric is empty or if there is doubt as to the passport number, please re-enter the passport number appearing in the space above and use the correction button)>>. The user can now utilise the correction button 76 and proceed with re-entering the passport number displayed on the document to be checked which serves to define the reference document to be taken into consideration for operation of fingerprint comparison.

The invention claimed is:

1. A process for automatic checking of the authenticity of an identity document comprising a first zone of textual personal data and a second zone of an image, comprising:
(a) a data-acquisition phase, comprising the steps of:
(a1) setting up a primary database in which information contained in first zones and images contained in second zones for a set of pre-existing identity documents are recorded,
(a2) extracting textual personal data from the information recorded in the primary database for each of the pre-existing identity documents via a process of optical character recognition and incorporating the textual personal data in coded form into a multicomponent anonymized digital signature called a fingerprint attributed to each of the pre-existing identity documents, wherein obtaining the textual personal data from the fingerprint is impossible,
(a3) extracting graphic information from the image recorded in the primary database for each of the pre-existing identity documents, creating a global fingerprint component obtained from the entire image gradient, and a plurality of local fingerprint components obtained from a predetermined number N of blocks corresponding to subdivisions of the image, binarized, with covering of fixed dimension, for each of the pre-existing identity documents, and
(a4) recording the fingerprint, the global fingerprint component, and the plurality of local fingerprint components of the pre-existing identity documents in a fingerprint database linked to a central server relocated relative to the primary database, the fingerprint, the global fingerprint component, and the plurality of local fingerprint components being indexed according to a reference number for each of the pre-existing identity documents; and
(b) a checking phase of an identity document to be checked at a checkpoint, the checking phase comprising the steps of:
(b1) digitizing the identity document to be checked and creating a digitized identity document to be checked,
(b2) extracting and reading by a process of optical character recognition the textual personal data contained in a first zone of the digitized identity document to be checked and coding the textual personal data to constitute a fingerprint component to be checked, wherein obtaining the textual personal data from the fingerprint component to be checked is impossible,
(b3) extracting graphic information of an image contained in a second zone of the digitized identity document to be checked, creating a global fingerprint component obtained from an entire image gradient, and a plurality of local fingerprint components obtained from a predetermined number N of blocks corresponding to subdivisions of the image, binarized, with covering of fixed dimension,
(b4) comparing inside the central server the fingerprint component, the global fingerprint component, and the plurality of local fingerprint components of the identity document to be checked with the fingerprint, the global fingerprint component, and the plurality of local fingerprint components of the identity document indexed in the fingerprint database with the same reference number, and
(b5) sending a message indicating a result of the comparison, wherein the result confirms an authenticity of the identity document to be checked, or the result identifies at least one of the fingerprint component, the global fingerprint component, and the plurality of local fingerprint components of the identity document to be checked as being suspect of having been falsified.

2. The process according to claim 1, wherein the checking phase further comprises verifying a quality of data of the digitized identity document, and sending an error message when the quality of data is insufficient.

3. The process according to claim 1, wherein the identity document further comprises a third zone of machine-readable information, wherein the checking phase of the identity document to be checked further comprises extracting and interpreting by a process of optical character recognition data contained in the third zone of machine-readable information of the identity document to be checked, and sending an error message in case of reading error of the third zone.

4. The process according to claim 3, further comprising a verification of coherence of the textual personal data extracted from the first zone of the identity document to be checked and of the data extracted from the third zone of machine-readable information of the identity document to be checked.

5. The process according to claim 1, wherein the extracting (b3) further comprises pre-processing of filtering operations for cleaning the image of parasite noises introduced during the digitizing step of the identity document to be checked.

6. The process according to claim 1, wherein the extracting and reading (b2) further comprises pre-processing for correcting defects introduced during the digitizing step of the identity document to be checked or inherent to natural ageing of the identity document to be checked.

7. The process according to claim 1, wherein the extracting (b3) further comprises calculating higher-order Zernike moments of the entire image gradient to obtain a global descriptor of graphic information to create the global fingerprint component.

8. The process according to claim 1, wherein the extracting (b3) further comprises the binarization of the image intended to be subdivided into the predetermined number N of blocks with covering of fixed dimension using a first level of processing via detection of multi-scale contours and a second level of processing by an adaptive threshold.

9. The process according to claim 8, wherein the local fingerprint components are obtained by the calculation of form descriptors on the N blocks of the binarized image with an order greater than or equal to 12.

10. The process according to claim 1, wherein the digitizing (b1) is performed at a checkpoint distinct from the central server, and the digitized identity document created at the checkpoint is transmitted to the central server via telecommunication means.

11. The process according to claim 1, wherein the digitizing (b1), the extracting and reading (b2), and the extracting (b3) are performed at a checkpoint distinct from the central server, and the fingerprint component, the global fingerprint component, and the plurality of local fingerprint components of the identity document to be checked are transmitted to the central server via telecommunication means.

12. A system for automatic checking of the authenticity of an identity document including at least one first zone of textual personal data and a second zone of an image, comprising:
 a data-acquisition module, including:
  a storage unit storing a primary database in which information contained in the first zone and the second zone for a set of pre-existing identity documents are recorded,
  a first unit comprising an optical character recognition device for extracting from the primary database the textual personal data of the first zone for each of the identity documents via a process of optical character recognition, and a device for incorporating the textual personal data in coded form into a multicomponent anonymized digital signature called a fingerprint attributed to each of the pre-existing identity documents, wherein obtaining the textual personal data from the fingerprint is impossible,
  a second unit comprising an optical character recognition device for extracting from the primary database graphic information of the second zone for each of the pre-existing identity documents, and a device to create a global fingerprint component obtained from an entire image gradient, and a plurality of local fingerprint components obtained from a predetermined number N of blocks corresponding to subdivisions of the image, binarized, with covering of fixed dimension, for each of the pre-existing identity documents, and
  a storage unit for recording the fingerprint, the global fingerprint component, and the plurality of local fingerprint components of the pre-existing identity documents in a fingerprint database linked to a central server relocated relative to the primary database, wherein the fingerprint, the global fingerprint component, and the plurality of local fingerprint components are indexed according to a reference number for each of the pre-existing identity documents; and
 a control module of identity documents to be checked, comprising:
  a digitizing unit of an identity document to be checked for creating a digitized identity document to be checked,
  a third unit including an optical character recognition device for extracting and reading by a process of optical character recognition of the textual personal data contained in a first zone of the digitized identity document to be checked, and a device for coding said data to constitute a fingerprint component to be checked, wherein obtaining the textual personal data from the fingerprint component to be checked is impossible, and
  a fourth unit including a device for extracting graphic information from an image contained in a second zone of the digitized identity document to be checked, a device to create a global fingerprint component obtained from an entire image gradient, and a device for creating a plurality of local fingerprint components obtained from a predetermined number N of blocks corresponding to subdivisions of the image, binarized, with covering of fixed dimension,
  the central server comparing a comparison unit for comparing the fingerprint component, the global fingerprint component, and the plurality of local fingerprint components of the identity document to be checked with the fingerprint, the global fingerprint component, and the plurality of local fingerprint components of the identity document indexed in the fingerprint database with the same reference number, and
  a unit for sending a message indicating a result of the comparison, wherein the result confirms an authenticity of the identity document to be checked, or the result identifies at least one of the fingerprint component, the global fingerprint component, and the plurality of local fingerprint components of the identity document to be checked as being suspect of having been falsified.

13. The system according to claim 12, further comprising a verification unit for checking a quality of data of the digitized identity document, and for sending of an error message when the quality of the data is insufficient.

14. The system according to claim 12, wherein the identity document further comprises a third zone of machine-readable information, wherein the control module further comprises a verification unit for extracting and interpreting by a process of optical character recognition data contained in the third zone of machine-readable information of the identity document to be checked and for sending an error message in case of reading error of the third zone.

15. The system according to claim 14, wherein the verification unit comprises means for verifying coherence of the textual personal data extracted from the first zone of the identity document to be checked and the data extracted from the third zone of machine-readable information of the identity document to be checked.

16. The system according to claim 12, wherein the fourth unit further comprises a pre-processing unit for conducting filtering operations for cleaning the image of parasite noises introduced during the digitizing of the identity document to be checked.

17. The system according to claim 12, wherein the third unit further comprises a pre-processing unit comprising correction means for correcting defects introduced during the digitizing of the identity document to be checked or inherent to natural ageing of the identity document to be checked.

18. The system according to claim 12, wherein the third unit and the fourth unit are located at a level of a terminal of an identity document to be checked, and the control module further comprises an Internet connection interface for communicating with the central server for transmitting the fingerprint component, the global fingerprint component, and the plurality of local fingerprint components of the identity document to be checked to the central server; and the central server comprising:

a receiving unit for receiving the fingerprint component, the global fingerprint component, and the plurality of local fingerprint components of the identity document to be checked, the fingerprint database, the comparison unit, and the unit for sending the message.

19. The system according to claim 12, wherein the control module further comprises an Internet connection interface for sending the digitized document to be checked to the central server, and the central server comprising the third unit, the fourth unit, the fingerprint database, and the unit for sending the message.

20. The system according to claim 12, wherein the central server further comprises the third unit, the fourth unit, the fingerprint database, and the unit for sending the message, and the central server is located geographically at a level of a terminal of an identity document to be checked.

* * * * *